US005601960A

United States Patent [19]

Mahabadi et al.

[11] Patent Number: 5,601,960

[45] Date of Patent: Feb. 11, 1997

[54] PROCESSES FOR LOW MELT CROSSLINKED TONER RESINS AND TONER

[75] Inventors: Hadi K. Mahabadi; Enno E. Agur, both of Toronto; T. Brian McAneney, Burlington; Sheau V. Kao; Gerald R. Allison, both of Oakville; Michael S. Hawkins, Cambridge, all of Canada; Bernard Grushkin, Pittsford, N.Y.; J. Stephen Kittelberger, Rochester, N.Y.; Joo T. Chung, Penfield, N.Y.; William H. Hollenbaugh, Jr., Webster, N.Y.

[73] Assignee: Xerox Corporation, Stamford, Conn.

[21] Appl. No.: 555,954

[22] Filed: Nov. 13, 1995

Related U.S. Application Data

[62] Division of Ser. No. 332,315, Oct. 31, 1994, Pat. No. 5,500,324.

[51] Int. Cl.$^6$ .................................................... C08G 63/20

[52] U.S. Cl. ............................................................ 430/137

[58] Field of Search ....................... 525/51, 437; 430/137

[56] References Cited

U.S. PATENT DOCUMENTS 5,227,460 7/1993 Mahabadi et al. ...................... 525/437

5,395,723 3/1995 Mahabadi et al. ...................... 430/137

*Primary Examiner*—John Goodrow

*Attorney, Agent, or Firm*—E. O. Palazzo

[57] ABSTRACT

A process comprising:

(a) reactive melt mixing of a base resin with a chemical initiator and crosslinking of said base resin to enable a highly crosslinked precursor resin, said highly crosslinked precursor resin being substantially free of sol, and comprising uncrosslinked portions and crosslinked portions, said crosslinked portions comprised of high density crosslinked microgel particles; and (b) accomplishing dilution by melt mixing said highly crosslinked precursor resin of (a) with a base resin to form a partially crosslinked toner resin, said toner resin being substantially free of sol, and comprising linear uncrosslinked portions and crosslinked portions, said crosslinked portions comprised essentially of high density crosslinked microgel particles, wherein said microgel particles are present in an amount of from about 1 to about 45 percent by weight of said toner resin.

23 Claims, 2 Drawing Sheets

PROCESSES FOR LOW MELT CROSSLINKED TONER RESINS AND TONER

This is a division, of application Ser. No. 332,315, Oct. 31, 1994, now U.S. Pat. No. 5,500,324.

BACKGROUND OF THE INVENTION

The present invention is generally directed to toners and processes for the preparation of toner resin and toner thereof. More specifically, the present invention relates to melt mixing processes, batch or continuous, but preferably continuous processes such as, for example, extrusion for preparing crosslinked toner resins and toners thereof. Specifically, the present invention in embodiments is directed to a two step melt mixing process in which (1) a reactive base resin is melt mixed with a chemical initiator to form a highly crosslinked precursor resin, and (2) the resulting highly crosslinked precursor resin is directed, especially fed to an extruder together with additional base resin, and optionally toner pigments and/or other known toner additives. In embodiments the process of the present invention enables the dilution of a highly crosslinked precursor resin to form toner resins and toner compositions thereof. The present invention relates to processes for the preparation of partially crosslinked toner resins or heat fixable toners with, for example, excellent low temperature fixing characteristics and superior gloss and offset properties in a hot roll fixing system, and with excellent vinyl offset properties and wherein in embodiments the fuser roll life can be increased.

The toner resin can be prepared as illustrated in U.S. Pat. No. 5,227,460 and U.S. Pat. No. 5,376,494, the disclosures of which are totally incorporated herein by reference. For example, the crosslinked resin selected can be prepared as illustrated in column 13, beginning at line 27, of the U.S. Pat. No. 5,227,460, and wherein a base resin and initiator are fed to an extruder; the base resin is melted; the molten resin and initiator are mixed; crosslinking is initiated by raising the melt temperature of the base resin and controlling the temperature along the extruder channel; retaining the polymer melt in the extruder for a sufficient residence time at a selected temperature to enable the desired amount of crosslinking; and providing high shear during crosslinking. Also, examples of base resins that can be selected for the processes of the present invention are illustrated in the '460 patent and the aforementioned copending application.

A need exists for a process to prepare toners which melt at lower temperatures than a number of toners now used with certain copying and printing machines. Temperatures of approximately 160° to 200° C. are often selected to fix a toner to a support medium such as a sheet of paper or transparency to create a developed image. These high temperatures may reduce or minimize the life of certain fuser rolls such as those comprised of silicone rubbers or fluoroelastomers like VITON, may limit fixing speeds; and/or may necessitate larger amounts of power to be consumed during operation of a copier or printer such as a xerographic copier which employs a method of fixing such as, for example, hot roll fixing.

Toner utilized in the electrographic process is generally prepared by mixing and dispersing a colorant and a charge enhancing additive into a thermoplastic binder resin, followed by micropulverization. As the thermoplastic binder resin, several polymers are known including polystyrenes, styrene-acrylic resins, styrene-methacrylic resins, polyesters, epoxy resins, acrylics, urethanes and copolymers thereof. As the colorant, carbon black or color pigment, such as cyan, can be selected, and as the charge enhancing additive, alkyl pyridinium halides, distearyl dimethyl ammonium methyl sulfate, and the like are known.

To fix the toner to a support medium, such as a sheet of paper or transparency, hot roll fixing is commonly used. In this method, the support medium carrying a toner image is transported between a heated fuser roll and a pressure roll, with the image face contacting the fuser roll. Upon contact with the heated fuser roll, the toner melts and adheres to the support medium, forming a fixed image. This fixing system is very advantageous in heat transfer efficiency and is especially suited for high speed electrophotographic processes.

Fixing performance of the toner can be characterized as a function of temperature. The lowest temperature at which the toner adheres to the support medium is referred to as the Cold Offset Temperature (COT), and the maximum temperature at which the toner does not adhere to the fuser roll is referred to as the Hot Offset Temperature (HOT). When the fuser temperature exceeds HOT, some of the molten toner adheres to the fuser roll during fixing and is transferred to subsequent substrates containing developed images, resulting for example in blurred images. This undesirable phenomenon is known as offsetting. Between the COT and HOT of the toner is the Minimum Fix Temperature (MFT) which is the minimum temperature at which acceptable adhesion of the toner to the support medium occurs, as determined by, for example, a creasing test. The difference between MFT and HOT is referred to as the Fusing Latitude.

Gloss performance of toner can be characterized as a function of fusing temperature. The fusing temperature at which the image attains a gloss level of 50 gloss units is referred to as the Gloss 50 Temperature, $T(G_{50})$; hereinafter, unless otherwise indicated, all gloss units refer to TAPPI T480 75° specular gloss. The difference between $T(G_{50})$ and HOT is referred to as the Gloss Latitude. The maximum gloss level of the image in the temperature range between MFT and HOT is referred to as the Peak Gloss.

Many prior art toner resins developed have the required melt viscosity to produce images with high gloss or low gloss on plain paper, for example from about 25 to about 60 gloss units for high gloss (high gloss toner resin) and from about 1 to about 15 gloss units for low gloss (low gloss toner resin). Toners which generate high gloss images are often selected for process and highlight color applications and transparencies; toners with low gloss are generally used for matte applications. Although these properties are desired, the fixing or fusing temperature of the toners are high and usually more than 160° C. This may result in high power consumption, low fixing speeds, and reduced life of the fuser roll and fuser roll bearings. Offsetting can also be a problem. Furthermore, toners containing vinyl type binder resins such as styrene-acrylic resins may have an additional problem which is known as vinyl offset. Vinyl offset occurs when a sheet of paper or transparency with a fixed toner image comes in contact for a period of time with a polyvinyl chloride (PVC) surface containing a plasticizer used in making the vinyl material flexible such as, for example, in vinyl binder covers, and the fixed image adheres to the PVC surface. Also, a number of toner resins with lower melt temperatures possess a narrow fusing latitude and have poor mechanical properties, creating too many fines during jetting which have to be removed by classification and reused. This results in increased toner cost. Furthermore, many prior art toner resins are prepared for specific uses and, therefore, there is a resin for a low gloss and another different resin for high gloss. This results in the need for a number of resin manufacturing processes which further increases the cost of the toners. These and other disadvantages are avoided or minimized in embodiments of the present invention.

There is a need for processes which can be used to prepare toner resins or toners for different applications such as high gloss or low gloss, with low fusing toner temperature below 200° C., preferably below 160° C., such as about 110° C. to about 155° C., (referred to as low fix temperature toner resin or toner, or low melt toner resin or toner), excellent offset performance, and superior vinyl offset properties. Toners which operate at lower temperatures would reduce the power needed for operation and increase the life of the fuser roll and the high temperature fuser roll bearings. Additionally, low melt toners would reduce the volatilization of release oil such as silicon oil which may occur during high temperature operation and which can cause problems when the volatilized oil condenses in other areas of the machine. In particular, low melt toners with a wide fusing and excellent gloss latitude and with acceptable toner particle elasticity are needed. Further, toners with wide fusing and excellent gloss latitude can provide flexibility in the amount of oil needed as a release agent; can minimize copy quality deterioration related to the toner offsetting to the fuser roll; and can extend fuser roll life. Furthermore, there is a need for economical processes wherein different resins for high gloss or low gloss toner are generated. These and other needs are achievable with the processes of the present invention.

To lower the minimum fix temperature of the toner, in some instances the molecular weight of the binder resin may be lowered. Low molecular weight and amorphous polyester resins and epoxy resins have been used for low temperature fixing toners. For example, attempts to use polyester resins as a binder for toner are disclosed in U.S. Pat. No. 3,590,000 and U.S. Pat. No. 3,681,106. The minimum fixing temperature of polyester binder resins can be lower than that of other materials, such as styrene-acrylic and styrene-methacrylic resins. However, this may lead to a lowering of the hot offset temperature, and as a result, decreased offset resistance and shortened fuser roll life. In addition, the glass transition temperature of the resin may be decreased, which may cause the undesirable phenomenon of blocking of the toner during storage. Furthermore, toner prepared from such a resin will produce images with undesirable crease performance and narrow fusing latitude.

U.S. Pat. No. 5,057,392, discloses a low fusing temperature toner powder which employs a polyblend of a crystalline polyester and an amorphous polyester that has been crosslinked with an epoxy novolac resin in the presence of a crosslinking catalyst. The disclosed polyblend contains a mechanical mixture of the crystalline and amorphous polyester melt blended together. The crystalline polyester is required to maintain a desired low melt temperature and the amorphous polyester is required to maintain a desired high offset temperature. In the polyblend, the amorphous polyester is partially crosslinked with the epoxy novolac resin. The disclosed toner powder requires the presence of crystalline and amorphous polyesters, and upon completion of crosslinking, the crystalline polyester recrystallizes as dispersed small particles within a matrix phase of the crosslinked amorphous polyester and epoxy resin. In a disclosed process for preparing the toner particles, the crystalline polyester, amorphous polyester resin, epoxy novolac resin, crosslinking catalyst, colorant, crystallization promoter and optional charge control agent are melt blended, preferably by an extrusion process. During melt blending, the amorphous polyester is crosslinked with the epoxy novolac resin. After melt blending the mixture is annealed to recrystallize the crystalline polyester. The disclosed melt blended mixture is not useful as a toner requiring a low melt temperature until it is annealed. In addition, the glossy image prepared on paper with toner prepared from such a mixture does not possess a wide fusing latitude, it is believed.

To prevent fuser roll offsetting and to increase fuser latitude of toners, various modifications have been made to toner compositions. For example waxes, such as low molecular weight polyethylene, or polypropylene, have been added to toners to increase the release properties, as disclosed in U.S. Pat. No. 4,513,074, the disclosure of which is incorporated herein by reference. However, to prevent offset sufficiently, considerable amounts of such materials may be required in some instances, resulting in detrimental effects such as the tendency for toner agglomeration, undesirable free flow properties and destabilization of charging properties. Also, waxes tend to degrade projection efficiency of glossy color transparencies.

Modification of binder resin structure, for example by branching, or crosslinking, when using conventional polymerization reactions may also improve offset resistance. In U.S. Pat. No. 3,681,106, for example, a polyester resin was improved with respect to offset resistance by nonlinearly modifying the polymer backbone by mixing a trivalent or more polyol or polyacid with the monomer to generate branching during polycondensation. However, an increase in degree of branching may result in an elevation of the minimum fix temperature. Thus, any initial advantage of low temperature fix may be diminished.

U.S. Pat. No. 4,797,339 discloses a modified toner resin containing a particle-to-particle ionically crosslinked resin complex. The disclosed crosslinked resin complex is obtained by reacting a cationic resin emulsion and an anionic resin emulsion. The resulting resin ion complex has a glass transition temperature of −90° to 100° C. and a degree of gellation of from 0.5 to 50 percent by weight, preferably 10 to 30 percent by weight. It is stated that if the degree of gellation is too high beyond 50 percent by weight, the fixability of the toner at low temperatures tends to be reduced undesirably. If it is too low below 0.5 percent by weight, scattering of the toner tends to increase undesirably. The emulsion polymerization process disclosed results in production of a sol component in the polymer (i.e., crosslinked portions which are not densely crosslinked).

A method of improving offset resistance of low melt toner is to utilize crosslinked resin in the binder resin. For example, U.S. Pat. No. 3,681,106 discloses a toner in which a crosslinked polyester, prepared using conventional crosslinking methods, is used as the binder resin. Similar disclosures for polyester resins are provided in U.S. Pat. Nos. 4,933,252 and 4,804,622.

While significant improvements can be obtained in offset resistance and entanglement resistance in toner resins, a major drawback may ensue in that with crosslinked resins prepared by conventional polymerization (that is, crosslinking during polymerization using monomer and a crosslinking agent), there exist three types of polymer configurations: a linear and soluble portion referred to as the linear portion; a portion comprising highly crosslinked gel particles which is not soluble in substantially any solvent, e.g., tetrahydrofuran, toluene and the like, and is the gel, and a crosslinked portion which is low in crosslinking density and therefore is soluble in some solvents, e.g., tetrahydrofuran, toluene and the like, and is the sol. Also, there are monomeric units between the crosslinked polymer chains. The presence of highly crosslinked gel in the binder resin increases the hot offset temperature, but at the same time the low crosslink density portion or sol increases the minimum fix temperature. An increase in the amount of crosslinking in these types of resins results in an increase not only of the gel content, but also of the amount of sol or soluble crosslinked polymer with low degree of crosslinking in the mixture. This results in an elevation of the minimum fix temperature, and as a consequence, in a reduction or reduced increase of the fusing latitude. In addition, a drawback of embodiments of crosslinked polymers prepared by conventional polycondensation in a reactor with low shear mixing, for example, less than about 0.1 kW-hr/kg, is that as the degree of crosslinking increases, the gel particles or very highly crosslinked insoluble polymer with high molecular weight grow larger. The large gel particles can be more difficult to disperse pigment in, causing the formation of unpigmented toner particles during pulverization, and toner developability may thus be hindered. Also, compatibility with other binder resins may be relatively poor and toners containing vinyl polymers often show vinyl offset.

U.S. Pat. No. 4,533,614 discloses a loosened crosslinked polyester binder resin which provides low temperature fix and good offset resistance, and wherein metal compounds were used as crosslinking agents. Similar disclosures are presented in U.S. Pat. No. 3,681,106 and Japanese Laid-Open patent applications Ser. Nos. 94362/1981, 116041/1981 and 166651/1980. As indicated in the '614 patent, incorporation of metal complexes, however, can influence unfavorably the charging properties of the toner. Also, with color toners other than black (e.g., cyan),-metal complexes can adversely affect the color of pigments. It is also known that metal containing toners can have disposal problems in some geographical areas, such as for example in the State of California, U.S.A. Metal complexes are often also costly.

Many processes are known for effecting polymerization reactions, including reactive extrusion processes, for both initial polymerization reactions employing monomers or prepolymers, and for polymer modification reactions, such as graft, coupling, crosslinking and degradation reactions. U.S. Pat. No. 4,894,308 and U.S. Pat. No. 4,973,439, for example, disclose extrusion processes for preparing electrophotographic toner compositions in which pigment and charge control additive were dispersed into the binder resin in the extruder. However, in each of these patents, there is no suggestion of a chemical reaction occurring during extrusion.

An injection molding process for producing crosslinked synthetic resin molded articles is disclosed in U.S. Pat. No. 3,876,736 in which polyolefin or polyvinyl chloride resin and crosslinking agent were mixed in an extruder, and then introduced into an externally heated reaction chamber outside the extruder wherein the crosslinking reaction occurred at increased temperature and pressure, and at low or zero shear.

In U.S. Pat. No. 4,089,917, an injection molding and crosslinking process is disclosed in which polyethylene resin and crosslinking agent were mixed in an extruder and reacted in reaction chambers at elevated temperature and pressure. Heating of the resin mixture occurred partially by high shear in inlet flow orifices. However, the crosslinking reaction in this process occurs in the reaction chambers at low or zero shear, and the final product is a thermoset molded part, and thus is not considered useful for toner resins.

A process for dispensing premixed reactive precursor polymer mixtures through a die for the purposes of reaction injection molding or coating is described in U.S. Pat. No. 4,990,293 in which polyurethane precursor systems were crosslinked in the die and not in the extruder. The dimensions of the die channel were determined such that the value of the wall shear stress was greater than a critical value in order to prevent gel buildup and consequent plugging of the die. The final product is a thermoset molded part, not considered useful as a toner resin.

The processes disclosed in U.S. Pat. Nos 3,876,736; 4,089,917 and 4,990,293 are not considered reactive extrusion processes, primarily because the crosslinking occurs in a die or a mold, and not in an extruder, and the crosslinking takes place at low or zero shear. These processes are for producing engineering plastics such as thermoset materials which cannot be remelted once molded, and thus are not useful in toner applications.

In U.S. Pat. No. 5,395,723, the disclosure of which is incorporated herein by reference, a polyester low melt toner resin is described which is prepared by reactive extrusion and which is suitable for low gloss matte application such as for example matte black images. Also in copending application U.S. Ser. No. 334,012 now U.S. Pat. No. 5,480,756, filed concurrently herewith, there is disclosed a polyester toner resin which is prepared by reactive extrusion and which is suitable for high gloss or process color application and which has low fix temperature, excellent offset resistance, wide fusing latitude and possesses minimized or substantially no vinyl offset. Also, in U.S. Pat. No. 5,227,460 there is disclosed low melt toners with reactive extruded resins and wherein the microgel particles can be present in an amount of from about 0.001 percent to about 50 percent, and other amounts, see column 7, beginning at line 23. The disclosures of each of the aforementioned documents are totally incorporated herein by reference.

There is a need for one process for the preparation of low gloss or high gloss, low melt toner resin or toner with excellent offset resistance, wide fusing and excellent gloss latitude, and which toner possesses minimized or substantially no vinyl offset, and wherein the toners can be selected for the generation of matte or glossy applications and transparencies.

SUMMARY OF THE INVENTION

Extensive research and problem solving conducted in connection with the present invention has demonstrated that the dilution of highly crosslinked precursor resins, such as for example, unsaturated polyester resins, with linear base resins can be used to prepare resins or toners with a wide range of unique properties, and which toners can possess low gloss or high gloss (dial a gloss), and low melt temperature fix applications.

Embodiments of the present invention overcome or minimize the above prior art problems of requiring different manufacturing process for the preparation of low gloss and high gloss toner resins or toners. The present invention provides a process for the preparation of different types of toner resins or toners which can be sufficiently fixed at low temperatures (e.g., below 200° C., preferably about 100° C. to about 160° C., more preferably about 110° C. to about 140° C.) by hot roll fixing and which enable images with low gloss or high gloss. Toners according to the present invention can have fusing latitudes in the range of about 20° C. to about 150° C., gloss latitudes for high gloss applications in the range of about 40° C. to about 100° C., and a high gloss of about 25 to about 60 gloss units. Thus, a fusing temperature of at least 25° C. less than for conventional higher fix temperature toner is provided while enabling images with a certain gloss. Hence, less power is consumed during operation of a copier or printer. The undesirable paper curl phenomenon may also be reduced, and a higher speed of copying and printing may be enabled. Also, toners of the present invention possess excellent offset resistance, wide fusing and excellent gloss latitude and superior rheological properties required for low melt both for low and high gloss applications, are economical, safe and economical, and show minimized or substantially no vinyl offset. The process of the present invention involves (1) crosslinking a linear reactive base resin (hereinafter referred to as base resin) such as, for example, an unsaturated linear polyester resin preferably using a chemical initiator such as, for example, organic peroxide as a crosslinking agent in a batch or continuous melt mixing device such as, for example, an extruder to produce a resin with a gel content of from about 20 percent to about 75 percent by weight (highly crosslinked precursor resin); and (2) melt mixing the highly crosslinked precursor resin with linear base resin and optionally pigment and other toner additives in a batch or continuous melt mixing device such as, for example, an extruder to produce toner resin or toner.

The toner resin, prepared by the process of this invention, comprises crosslinked portions and linear portions. The crosslinked portions comprise very high molecular weight densely crosslinked gel particles having an average diameter of less than about 0.1 micron in embodiment with substantially no sol. The crosslinking length between two crosslinked molecules is very short; preferably the crosslinking lengths do not exceed one to two atoms. The crosslinked portions are insoluble in substantially any solvent, including tetrahydrofuran, toluene and the like. The crosslinked portions comprise from about 1 to about 10 percent by weight of the toner resin for high gloss, and from about 20 to about 45 percent by weight for low gloss. The linear portion comprises low molecular weight resin soluble in various solvents such as for example tetrahydrofuran, toluene and the like. The high molecular weight highly crosslinked gel particles are substantially uniformly distributed in the linear portions. Substantially no portion of the resin comprises sol or low density crosslinked polymer, such as that which would be obtained in conventional crosslinking processes such as polycondensation, bulk, solution, suspension, emulsion and dispersion polymerization processes.

In a reactive melt mixing process of the invention, initially a base resin is crosslinked in the molten state under high temperature, for example above the melting temperature of the resin and preferably up to about 150° C. above that melting temperature, and at high shear conditions, for example a shear energy input of about 0.1 to about 0.5 kW-hr/kg, preferably using a chemical initiator such as, for example, organic peroxide, as a crosslinking agent, in a batch or continuous melt mixing device, without forming any significant amounts of residual materials. Thus, the removal of byproducts or residual unreacted materials is not needed with embodiments of the processes of the present invention. In embodiments of this process, the base resin and initiator are preblended and fed upstream to a melt mixing device such as an extruder at an upstream location, or the base resin and initiator are fed separately to the melt mixing device at either upstream or downstream locations. An extruder screw configuration, length and temperature may be used which enable the initiator to be well dispersed in the polymer melt before the onset of crosslinking, and further, which provide a sufficient, but short, residence time for the crosslinking reaction to be accomplished. Adequate temperature control enables the crosslinking reaction to be carried out in a controlled and reproducible fashion. Gel content of the resulting highly crosslinked precursor resin according to the present invention may be controlled by the melt temperature and/or amount of chemical initiator. For example, a temperature sufficiently high to achieve crosslinking is maintained in the presence of a chemical initiator. Once the desired amount of crosslinking is obtained, the melt temperature is reduced to terminate the crosslinking reaction. The gel content may also be controlled by the amount of chemical initiator used. Furthermore, the choice of extruder screw configuration and length can also enhance the high shear conditions to distribute microgels formed during the crosslinking reaction throughout the polymer melt, and to retain the microgels from inordinately increasing in size with increasing degree of crosslinking. An optional devolatilization zone may be used to remove any volatiles, if needed. The polymer melt may then be pumped through a die to a pelletizer.

The process can be utilized to produce a low cost, highly crosslinked precursor toner resin with substantially no unreacted or residual byproducts of crosslinking, which precursor can be used in the dilution process (step 2) of this invention for the preparation of different toner resins or toners with low fixing temperature by hot roll fixing to afford energy saving, which are particularly suitable for high speed fixing, show excellent offset resistance and wide fusing and excellent gloss latitude, show minimized or no vinyl offset and are useful in high gloss or matte finish applications. This is enabled primarily with the content of the microgel particles in the toner of an important amount of from about 1 to about 10 percent by weight and preferably from about 2 to about 9 percent by weight for high gloss, and from about 20 to about 45 percent by weight and preferably from about 30 to about 40 percent by weight for low gloss.

DETAILED DESCRIPTION OF EMBODIMENTS

Figure 1:
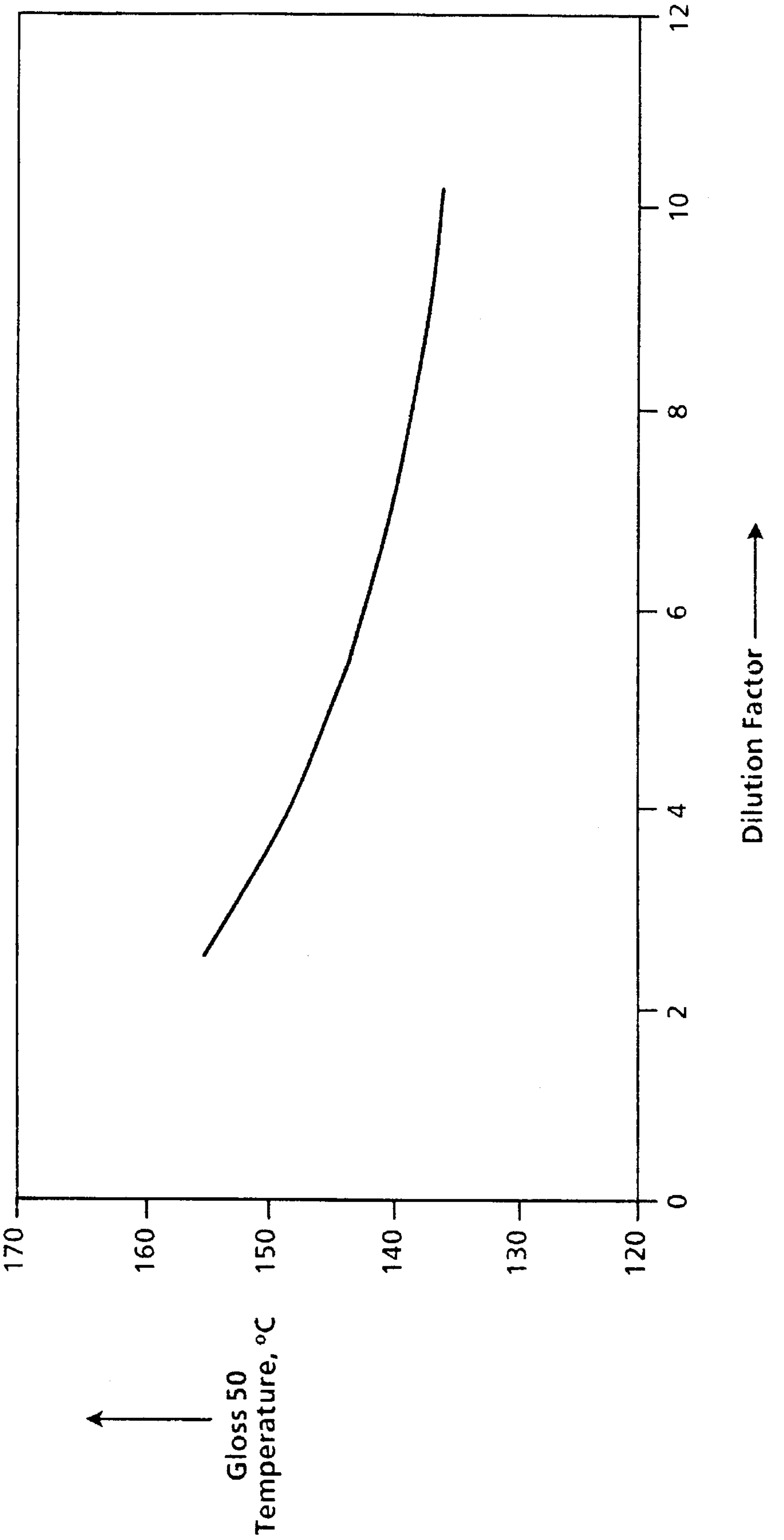
FIG. 1 illustrates the effect of diluting a highly crosslinked precursor resin with base resin on the gloss performance of the toner resin or toner. The dilution factor is the ratio of the base resin weight to highly crosslinked precursor resin weight in the resin mixture. The base resin is poly(propoxylated bisphenol A fumarate) and the highly crosslinked polyester contains 32 weight percent of gel.

There is a need for a single process to prepare high or low gloss crosslinked toner resin or toner by producing a highly crosslinked precursor resin containing from about 20 to about 75 percent by weight of microgel, and diluting the highly crosslinked precursor resin with a linear base resin to produce a toner resin containing from about 1 to about 10 percent by weight of microgel for high gloss application and from about 20 to about 45 percent by weight of microgel for low gloss application. The crosslinked portion of the highly crosslinked precursor resin and diluted toner resin is in the form of microgels distributed throughout the linear portion, in the substantial absence of sol, in which the polymer is densely crosslinked without monomeric units between the crosslinked chains and the size of the gel particles does not grow with increasing degree of crosslinking. The present invention provides such a process which involves a reactive melt mixing process to produce a highly crosslinked precursor resin with a gel content of from about 20 to about 75 percent by weight, and diluting the highly crosslinked precursor resin with base resin to produce toner resin or toner and developer thereof.

For applications such as process color, the toner resin and toners thereof of the present invention enable images having high gloss with gloss ranging from about 25 to about 80 gloss units, and preferably from about 25 to about 60 gloss units. For low gloss applications, the toner resin and toners thereof of the present invention enable images having gloss ranging from about 1 to about 25 gloss units, and preferably from about 1 to about 15 gloss units.

The present invention provides a low fix temperature toner resin or toner, based on crosslinked resin comprised of crosslinked and linear portions, the crosslinked portion consisting essentially of microgel particles substantially uniformly distributed throughout the linear portion. In this resin, the crosslinked portion consists essentially of microgel particles, preferably up to about 0.1 micron, more preferably about 0.005 to about 0.1 micron, in average volume particle diameter as determined by scanning electron microscopy and transmission electron microscopy as well as by light scattering. When produced by the process of the present invention wherein the crosslinking occurs at high temperature and under high shear, the size of the microgel particles does not continue to grow with increasing degree of crosslinking. Also, the microgel particles are distributed substantially uniformly throughout the linear portion.

The crosslinked portions or microgel particles are prepared in such a manner that there is substantially no distance between the polymer chains (preferably the crosslinking lengths do not exceed one to two atoms). Thus, the crosslinking is not accomplished via monomer or polymer bridges. The polymer chains are directly connected, for example at unsaturation sites or other reactive sites, or in some instances by a single intervening atom such as, for example, oxygen. Therefore, the crosslinked portions are very dense and do not swell as much as gel produced by conventional crosslinking methods. This crosslink structure is considered different than conventional crosslinking in which the crosslink distance between chains is quite large with several monomer units, and where the gels swell very well in a solvent such as tetrahydrofuran or toluene. These highly crosslinked dense microgel particles distributed throughout the linear portion impart elasticity to the resin which improves the toner offset properties, while not substantially affecting the toner minimum fix temperature.

The present invention provides a process for preparing a new type of toner resin having a low melt temperature, which is preferably a partially crosslinked unsaturated resin, such as resin prepared by the process of present invention, which involves the following steps: (1) crosslinking a base resin such as linear unsaturated polyester resin preferably with a chemical initiator in a melt mixing device such as, for example, an extruder at high temperature (e.g., above the melting temperature of the resin and preferably up to about 150° C. above that melting temperature) and under high shear (e.g., specific shear energy input of about 0.1 to about 0.5 kW-hr/kg) to obtain a highly crosslinked precursor resin containing from about 20 to about 75 percent by weight of microgel; and (2) diluting the highly crosslinked precursor resin of step (1) with base resin using a melt mixing device such as an extruder. Further, the present invention provides a process for preparing a toner with a low melt temperature in which step (2) of the above process includes mixing pigment and optionally other toner additives, such as low molecular weight waxes, charge additives, and the like, into mixture of highly crosslinked precursor resin and base resin. The base resin of step (2) is preferably of the same composition as the base resin of step (1).

In preferred embodiments, the base resin has a degree of unsaturation of about 0.1 to about 30 mole percent, and preferably about 5 to about 25 mole percent. The shear levels should be sufficient to inhibit microgel growth above about 0.1 micron average particle diameter, and preferably from about 0.005 to about 0.1 micron, and to ensure substantially uniform distribution of the microgel particles. These shear levels are readily available in melt mixing devices such as extruders.

The toner resin or toner as obtained by the process of the present invention has a weight fraction of the microgel in the resin mixture (hereinafter referred to as gel content) in the range typically from about 1 to about 10 percent by weight, and preferably from about 2 to about 9 percent by weight for high gloss application, and from about 20 to about 45 percent by weight, and preferably from about 30 to about 40 percent by weight for low gloss application. Increasing the ratio of base resin weight to highly crosslinked precursor resin weight, that is dilution factor, results in decreased gel content and increased gloss level of the toner resin or toner as shown in FIG. 1. For applications such as process color, the toner resin or toner enables images with high gloss with gloss ranging from about 25 to about 80 gloss units, preferably from about 25 to about 60 gloss units, and for low gloss applications, the toner resin or toner enables images to possess gloss ranging from a bout 1 to about 25 gloss units, preferably from about 1 to about 15 gloss units.

The rheology of the toner resins and toners of the present invention enable the use thereof for low melt applications and are characterized by a sharp drop in viscosity at low temperature followed by a reduction in viscosity vs. temperature slope at higher temperatures in embodiments. The uncrosslinked base resin, preferably unsaturated polyester, is present in the amount range of from about 90 to about 99 percent by weight of the toner resin, and preferably in the range of from about 91 to about 98 percent by weight of the toner resin for high gloss application, and from about 80 to about 55 percent by weight of the toner resin, and preferably for about 60 to about 70 percent by weight of the toner resin. The linear uncrosslinked resin preferably consists essentially of a low molecular weight reactive base resin which does not crosslink during the crosslinking reaction of step (1) and which is added in step (2), and is preferably unsaturated polyester resin.

According to embodiments of the invention, the number average molecular weight ($M_n$) of the linear portion, as measured by gel permeation chromatography (GPC), is in the range typically from about 1,000 to about 20,000, and preferably from about 2,000 to about 5,000. The weight average molecular weight ($M_w$) of the linear portion is in the range of typically from about 2,000 to about 40,000, and preferably from about 4,000 to about 20,000. The molecular weight distribution ($M_w/M_n$) of the linear portion is in the range of typically from about 1.5 to about 6, and preferably from about 2 to about 4. The onset glass transition temperature (Tg) of the linear portion as measured by differential scanning calorimetry (DSC) for preferred embodiments is in the range typically from about 50° C. to about 70° C., and preferably from about 51° C. to about 65° C. Melt viscosity of the linear resin of preferred embodiments, as measured with a mechanical spectrometer at 10 radians per second, is from about 5,000 to about 200,000 poise, and preferably from about 20,000 to about 100,000 poise, at 100° C. and drops sharply with increasing temperature to from about 100 to about 5,000 poise, and preferably from about 400 to about 2,000 poise, as temperature rises from 100° C. to 130° C. Melt flow index of the linear portion of preferred embodiments is from about 20 to about 80 grams per 10 minutes, as measured at 117° . with a 2.16 kilogram weight.

The low melt toner resin prepared by the processes of the present invention contains a mixture of crosslinked resin microgel particles and a linear portion as illustrated herein. In embodiments, the toner resin of the present invention possesses an onset Tg in the range typically from about 50° C. to about 70° C., and preferably from about 51° C. to about 65° C. and a melt flow index in the range of typically from about 0.01 to about 40 grams per 10 minutes (measured at 117° C. with a 2.16 kilogram weight), and preferably from about 0.1 to about 30 grams per 10 minutes (measured at 117° C. with a 2.16 kilogram weight).

The low fix temperature characteristics of the toner resin prepared by the process of present invention is primarily a function of the molecular weight and molecular weight distribution of the linear portion, and is not affected by the amount of microgel particles or degree of crosslinking. The hot offset temperature is increased with the presence of microgel particles which impart elasticity to the resin. Low level of microgel content, for example from about 1 to about 10 percent by weight, is required for high gloss application, that is for a gloss level in the range of from about 25 to about 80 gloss units, and preferably from about 25 to about 60 gloss units. High level microgel content, for example from about 20 to about 45 percent by weight, is selected for low gloss application, that is, for a gloss level in the range from about 1 to about 25 gloss units, and preferably from about 1 to about 15 gloss units.

The toner resin of the present invention provides a low melt toner with a minimum fix temperature of from about 100° C. to about 200° C., preferably about 100° C. to about 160° C., and more preferably about 110° C. to about 140° C.; a low melt toner with a wide fusing and gloss latitude to minimize or prevent offset of the toner onto the fuser roll; a high toner pulverization efficiency; and provides toner with a high or low gloss. The low melt toner preferably has a fusing latitude in the range of from about 20° C. to about 150° C. For high gloss application, the low melt toner preferably has a gloss latitude in the range of from about 40° C. to about 100° C.

As the microgel content decreases, the low temperature melt viscosity does not change appreciably, while the high temperature melt viscosity decreases and image gloss increases. This can be achieved by crosslinking in the melt state at high temperature and high shear such as, for example, by crosslinking an unsaturated polyester using a chemical initiator in an extruder resulting in the formation of a highly crosslinked resin containing microgel from about 20 to about 75 percent by weight and subsequently mixing the resulting highly crosslinked resin with linear resins, and melt mixed in an extruder to prepare resins containing microgel, which are distributed substantially uniformly throughout the linear portion, and wherein substantially no intermediates or sol portions, which are crosslinked polymers with low crosslinking density, are formed.

In a preferred embodiment, the crosslinked portion of the toner resin consists essentially of very high molecular weight microgel particles with high density crosslinking (measured by gel content) and which are not soluble in substantially any solvents such as, for example, tetrahydrofuran, toluene, and the like. The microgel particles are highly crosslinked polymers with a very small crosslink distance; preferably the microgel particles are directly crosslinked. This type of crosslinked polymer may be formed by reacting chemical initiator with linear unsaturated polymer, and more preferably a linear unsaturated polyester at high temperature and under high shear. The initiator molecule breaks into radicals and reacts with one or more double bond or other reactive site within the polymer chain forming a polymer radical. This polymer radical reacts with other polymer chains or polymer radicals many times, forming a highly and directly crosslinked microgel. This renders the microgel very dense and results in the microgel not swelling well in solvent. The dense microgel also imparts elasticity to the resin and increases its hot offset temperature while not affecting its minimum fix temperature.

The weight fraction of the microgel (gel content) in the resin may be defined as follows:

$$\text{Gel Content} = \frac{\text{Total Sample Weight} - \text{Weight of Soluble Polymer}}{\text{Total Sample Weight}} \times 100\%$$

The gel content may be calculated by measuring the relative amounts of linear, soluble polymer and the nonlinear, crosslinked polymer utilizing the following procedure: (1) the sample of the crosslinked resin to be analyzed, in an amount between 145 and 235 milligrams, is weighed directly into a glass centrifuge tube; (2) 45 milliliters of toluene are added and the sample is put on a shaker for at least 3 hours, preferably overnight; (3) the sample is then centrifuged at about 2,500 rpm for 30 minutes and then a 5 milliliter aliquot is carefully removed and placed into a preweighed aluminum dish; (4) the toluene is allowed to air evaporate for about 2 hours, and then the sample is further dried in a convection oven at 60° C. for about 6 hours or to constant weight; and (5) the sample remaining, times nine, provides the amount of soluble polymer. Thus, utilizing this quantity in the above equation, the gel content can be easily calculated.

Linear unsaturated polyesters, which may preferably be used as the base resin, are low molecular weight condensation polymers and which may be formed by stepwise reactions between both saturated and unsaturated diacids (or anhydrides) and dihydric alcohols (glycols or diols). The resulting linear unsaturated polyesters are reactive (e.g., crosslinkable) on (i) unsaturation sites (double bonds) along the polyester chain, and (ii) functional groups, such as carboxyl, hydroxy, and the like, groups amenable to acid-base reactions. Typical unsaturated polyester base resins useful for this invention are prepared by melt polycondensation or other polymerization processes using diacids and/or anhydrides and diols. Suitable diacids and anhydrides include, but are not limited to, saturated diacids and/or anhydrides, such as for example succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like, and mixtures thereof; and unsaturated diacids and/or anhydrides, such as for example maleic acid, fumaric acid, chloromaleic acid, methacrylic acid, acrylic acid, itaconic acid, citraconic acid, mesaconic acid, maleic anhydride, and the like, and mixtures thereof. Suitable diols include but are not limited to, for example, propylene glycol, ethylene glycol, diethylene glycol, neopentyl glycol, dipropylene glycol, dibromoneopentyl glycol, propoxylated bisphenol A, 2,2,4-trimethylpintane- 1,3-diol, tetrabromo bisphenol dipropoxy ether, 1,4-butanediol, and the like, and mixtures thereof, soluble in solvents such as, for example, tetrahydrofuran, toluene, and the like.

Preferred unsaturated polyester base resins selected for the processes of the present invention are prepared from diacids and/or anhydrides such as, for example, maleic anhydride, fumaric acid, and the like, and mixtures thereof, and diols such as, for example, propoxylated bisphenol A, propylene glycol, and the like, and mixtures thereof. A particularly preferred polyester is poly(propoxylated bisphenol A fumarate).

Substantially, any suitable unsaturated polyester can be selected to prepare the toner resins of the present invention, including unsaturated polyesters known for use in toner resins and including unsaturated polyesters whose properties previously rendered them undesirable or unsuitable for use as toner resins (but which adverse properties are eliminated or reduced by preparing them in the partially crosslinked form of the present invention).

The crosslinking which occurs in the process of the invention is characterized by at least one reactive site (e.g., one unsaturation) within a polymer chain reacting substantially directly (e.g., with no intervening monomer(s)) with at least one reactive site within a second polymer chain, and by this reaction occurring repeatedly to form a series of crosslinked units. This polymer crosslinking reaction may occur by a number of mechanisms as illustrated, for example, in U.S. Pat. No. 5,227,460, the disclosure of which is incorporated herein by reference.

Chemical initiators, such as, for example, organic peroxides or azo-compounds, are preferred for preparing the crosslinked toner resins of the present invention. Suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di(2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di(benzoyl peroxy) hexane, oo-t-butyl o-(2-ethyl hexyl) mono peroxy carbonate, and oo-t-amyl o-(2-ethyl hexyl) mono peroxy carbonate; alkyl peroxides such as, for example, dicumyl peroxide, 2,5-dimethyl 2,5-di (t-butyl peroxy) hexane, t-butyl cumyl peroxide, α-α-bis(t-butyl peroxy) diisopropyl benzene, di-t-butyl peroxide and 2,5-dimethyl 2,5-di(t-butyl peroxy) hexyne-3; alkyl hydroperoxides such as, for example, 2,5-dihydro peroxy 2,5-dimethyl hexane, cumene hydroperoxide, t-butyl hydroperoxide and t-amyl hydroperoxide; and alkyl peroxyketals such as, for example, n-butyl 4,4-di(t-butyl peroxy) valerate, 1,1-di(t-butyl peroxy) 3,3,5-trimethyl cyclohexane, 1,1-di(t-butyl peroxy) cyclohexane, 1,1-di(t-amyl peroxy) cyclohexane, 2,2-di(t-butyl peroxy) butane, ethyl 3,3-di(t-butyl peroxy) butyrate and ethyl 3,3-di(t-amyl peroxy) butyrate. Suitable azo-compounds include azobis-isobutyronitrile, 2,2'-azobis(isobutyronitrile), 2,2'-azobis(2,4-dimethyl valeronitrile), 2,2'-azobis(methyl butyronitrile), 1,1'-azobis(cyano cyclohexane), and other similar known compounds.

By selecting and consuming low concentrations of chemical initiator in the crosslinking reaction, usually in the range of from about 0.01 to about 15 percent by weight, and preferably in the range of from about 0.05 to about 5 percent by weight, the residual contaminants produced in the crosslinking reaction in preferred embodiments can be minimal. Since the crosslinking can be accomplished at high temperature, the reaction is very rapid (e.g., less than 10 minutes, preferably about 2 seconds to about 5 minutes residence time), and thus little or no unreacted initiator remains in the product.

A reactive melt mixing process is a process wherein chemical reactions can be carried out on the polymer in the melt phase in a melt mixing device, such as an extruder. In preparing the toner resins of the invention, these reactions are used to modify the chemical structure and the molecular weight, and thus the melt theology and fusing properties of the polymer. Reactive melt mixing is particularly efficient for highly viscous materials, and is advantageous because it requires no solvents, and thus is easily environmentally controlled. It is also advantageous because it permits a high degree of initial mixing of resin and initiator to take place, and provides an environment wherein a controlled high temperature (adjustable along the length of the extruder) is available so that a very quick reaction can occur. It also enables a reaction to take place continuously, and thus the reaction is not limited by the disadvantages of a batch process, wherein the reaction must be repeatedly stopped so that the reaction products may be removed, and the apparatus cleaned and prepared for another similar reaction. The specific gel content (i.e. amount of crosslinking) may be regulated by the length of time the extrusion mixture is maintained at elevated temperature. As soon as the desired amount of crosslinking is achieved, the reaction products can be quickly removed from the reaction chamber. The amount of initiator used may also control the amount of crosslinking. By providing a specific amount of initiator to effect a predetermined amount of crosslinking, the desired gel content (amount of crosslinking) is not exceeded.

The process of the present invention in embodiment selects a highly crosslinked precursor resin prepared by reactive melt mixing and containing from about 20 to about 75 percent by weight microgel, which is first blended with linear base resin, and optionally pigment and other toner additives, and then melt mixed in an extruder. The amount of the highly crosslinked precursor blended with the base resin is from about 1 to about 99 percent of the total weight of the mixture. Low melt toners and toner resins may be prepared by the process of the present invention wherein reactive resins are highly crosslinked and then diluted by using base resin. For example, a highly crosslinked precursor resin may be fabricated by a reactive melt mixing process comprising the steps of (1) melting reactive base resin, thereby forming a polymer melt in a melt mixing device; (2) initiating crosslinking of the polymer melt, preferably with a chemical crosslinking initiator and at increased reaction temperature; (3) retaining the polymer melt in the melt mixing device for a sufficient residence time that partial crosslinking of the base resin may be achieved; (4) providing sufficiently high shear during the crosslinking reaction to retain the gel particles formed during crosslinking small in size and well distributed in the polymer melt; and (5) optionally devolatilizing the polymer melt to remove any effluent volatiles. The high temperature reactive melt mixing process allows for very rapid crosslinking which enables the production of substantially only microgel particles, and the high shear of the process prevents undue growth of the microgels and enables the microgel particles to be uniformly distributed in the resin. The highly crosslinked precursor resin can be fabricated into a toner resin or toner by a dilution process, which comprises the steps of (1) blending the highly crosslinked precursor resin with base resin, and optionally with pigment and other toner additives; (2) melting the mixture thereby forming a molten mixture and mixing it in a melt mixing device; (3) providing sufficiently high shear during the crosslinking reaction to retain the gel particles formed during crosslinking small in size and well distributed in the polymer melt; and (4) optionally devolatilizing the polymer melt to remove any effluent volatiles.

In a preferred embodiment, the reactive melt mixing process comprises the steps of (1) feeding base resin and initiator to an extruder; (2) melting the base resin, thereby forming a polymer melt; (3) mixing the molten base resin and initiator at low temperature to enable excellent dispersion of the initiator in the base resin before the onset of crosslinking; (4) initiating crosslinking of the base resin with the initiator by raising the melt temperature and controlling it along the extruder channel; (5) retaining the polymer melt in the extruder for a sufficient residence time at a given temperature such that the required amount of crosslinking is achieved; (6) providing sufficiently high shear during the crosslinking reaction thereby retaining the gel particles formed during crosslinking small in size and well distributed in the polymer melt; (7) optionally devolatilizing the melt to remove any effluent volatiles; and (8) pumping the highly crosslinked precursor resin melt through a die to a pelletizer. The precursor resin may be prepared by a reactive melt mixing process disclosed in detail in copending application U.S. Ser. No. 07/814,641, the disclosure of which is incorporated herein by reference. In a preferred embodiment, the dilution process of the present invention comprises the steps of (1) feeding highly crosslinked precursor resin and base resin, and optionally pigment and other toner additives to an extruder; (2) melting the mixture thereby forming a melt; (3) melt mixing the mixture at a temperature to enable good dispersion of microgel particle in the toner resin or toner; (4) providing sufficiently high shear during the crosslinking reaction thereby retaining the gel particles formed during crosslinking small in size and well distributed in the toner resin or toner; (5) optionally devolatilizing the melt to remove any effluent volatiles; and (6) directing the crosslinked toner resin or toner melt through a die to a pelletizer.

In the process of the present invention, the fabrication of the highly crosslinked precursor resin and dilution of the highly crosslinked precursor resin to toner resin or toner may be carried out in a melt mixing device, such as an extruder described in U.S. Pat. No. 4,894,308, the disclosure of which is totally incorporated herein by reference. Generally, any high shear, high temperature melt mixing device suitable for processing polymer melts may be employed provided that the objectives of the present invention are achieved. Examples of continuous melt mixing devices include single screw extruders or twin screw extruders, continuous internal mixers, gear extruders, disc extruders and roll mill extruders. Examples of batch internal melt mixing devices include Banbury mixers, Brabender mixers and Haake mixers.

One suitable type of extruder is the fully intermeshing corotating twin screw extruder such as, for example, the ZSK-30 twin screw extruder, available from Werner & Pfleiderer Corporation, Ramsey, N.J., U.S.A., which has a screw diameter of 30.7 millimeters and a length- to-diameter (L/D) ratio of 37.2. The extruder can melt the base resin, mix the initiator into the base resin melt, provide high temperature, and adequate residence time for the crosslinking reaction to be carried out, control the reaction temperature via appropriate temperature control along the extruder channel, optionally devolatilize the melt to remove any effluent volatiles if needed, and pump the crosslinked polymer melt through a die such as, for example, a strand die to a pelletizer. For chemical reactions in highly viscous materials, reactive extrusion is particularly efficient, and is advantageous because it requires no solvents, and thus is easily environmentally controlled. It is also advantageous because it permits a high degree of initial mixing of base resin and initiator as well as highly crosslinked resin and base resin to take place, and provides an environment wherein a controlled high temperature (adjustable along the length of the extruder) is available so that a very quick mixing and/or reaction can occur. It also enables a mixing and/or reaction to take place continuously, and thus the mixing and/or reaction is not limited by the disadvantages of a batch process, wherein the reaction and/or mixing must be repeatedly stopped so that the products may be removed, and the apparatus cleaned and prepared for another similar reaction. As soon as the desired amount of crosslinking and/or desired level of mixing is achieved, the reaction products can be immediately removed from the extruder.

Figure 2:
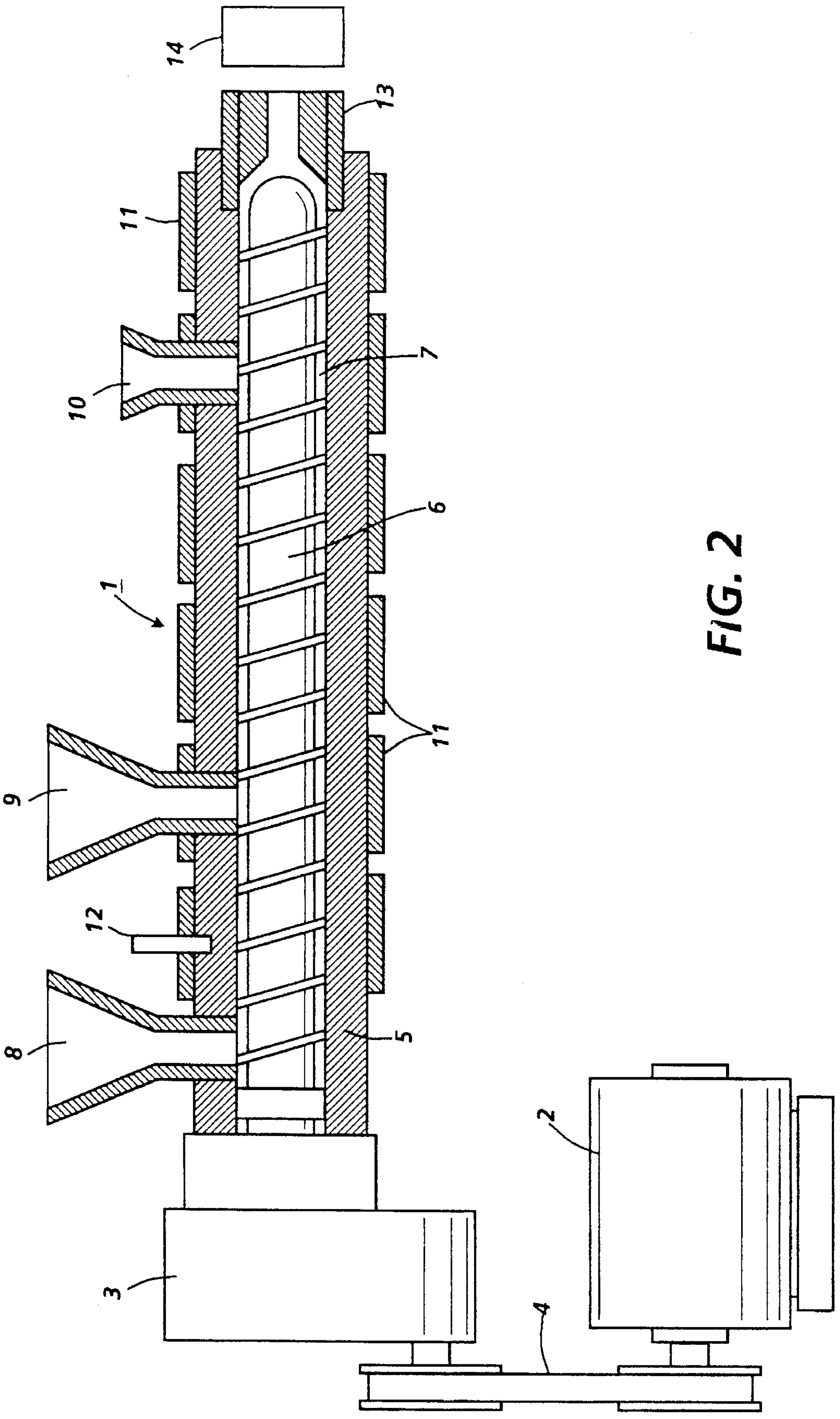
FIG. 2 is a partially schematic cross-sectional view of an extrusion apparatus suitable for the process of the present invention.

For a better understanding of a process according to the present invention, a typical extrusion apparatus suitable for the process of the present invention is illustrated in FIG. 2. FIG. 2 illustrates a twin screw extrusion device 1 containing a drive motor 2, a gear reducer 3, a drive belt 4, an extruder barrel 5, a screw 6, a screw channel 7, an upstream supply port or hopper 8, a downstream supply port 9, a downstream devolatilizer 10, a heater 11, a thermocouple 12, a die or head pressure generator 13, and a pelletizer 14. The barrel 5 consists of modular barrel sections, each separately heated with heater 11 and temperature controlled by thermocouple 12. With modular barrel sections, it is possible to locate feed ports and devolatilizing ports at required locations, and to provide segregated temperature control along the screw channel 7. The screw 6 is also modular, enabling the screw to be configured with modular screw elements and kneading elements having the appropriate lengths, pitch angles, etc. in such a way as to provide optimum conveying, mixing, reaction, devolatilizing and pumping conditions.

In operation of the first part of the proposed process for preparation of highly crosslinked precursor resin containing from about 20 to about 75 percent by weight of microgel, the components to be reacted and extruded, e.g., the base resin and chemical initiator, enter the extrusion apparatus from the first upstream supply port 8 and/or second downstream supply port 9. The base resin, usually in the form of solid pellets, chips, granules, or other forms can be fed to the first upstream supply port 8 and second downstream supply port 9 by starve feeding, gravity feeding, volumetric feeding, loss-in-weight feeding, or other known feeding methods. Feeding of the chemical initiator to the extruder depends in part on the nature of the initiator. In one embodiment of the invention, especially if the initiator is a solid, the base resin and initiator are preblended prior to being added to the extruder, and the preblend, the base resin and/or additional initiator may be added through either upstream supply port 8, downstream supply port 9, or both. In another embodiment, especially if the initiator is a liquid, the base resin and initiator can preferably be added to the extruder separately through upstream supply port 8, downstream supply port 9, or both. This does not preclude other methods of adding the base resin and initiator to the extruder. After the base resin and initiator have been fed into screw channel 7, the resin is melted, and the initiator is dispersed into the molten resin as it is heated, but preferably still at a lower temperature than is needed for crosslinking. Heating takes place from two sources: (1) external barrel heating from heaters 11; and (2) internal heating from viscous dissipation within the polymer melt itself. When the temperature of the molten resin and initiator reach a critical point, onset of the crosslinking reaction takes place. It is preferable, although not absolutely necessary, that the time required for completion of the crosslinking reaction not exceed the residence time in the screw channel 7. The rotational speed of the extruder screw preferably ranges from about 50 to about 500 revolutions per minute. If needed, volatiles may be removed through downstream devolatilizer 10 by applying a vacuum. At the end of screw channel 7, the highly crosslinked precursor resin is pumped in molten form through die 13, such as for example a strand die, to pelletizer 14 such as, for example, a water bath pelletizer, underwater granulator, and the like.

With further reference to FIG. 2, the rotational speed of the screw 6 can be of any suitable value provided that the objectives of the present invention are achieved. Generally, the rotational speed of screw 6 is from about 50 revolutions per minute to about 500 revolutions per minute. The barrel temperature, which is controlled by thermocouples 12 and generated in part by heaters 11, is from about 40° C. to about 250° C. The temperature range for mixing the base resin and initiator in the upstream barrel zones is from about the melting temperature of the base resin to below the crosslinking onset temperature, and preferably within about 40° C. of the melting temperature of the base resin. For example, for an unsaturated polyester base resin the temperature is preferably about 90° C. to about 130° C. The temperature range for the crosslinking reaction in the downstream barrel zones is above the crosslinking onset temperature and the base resin melting temperature, preferably within about 150° C. of the base resin melting temperature. For example, for an unsaturated polyester base resin, the temperature is preferably about 90° C. to about 250° C. The die or head pressure generator 13 generates pressure from about 50 pounds per square inch to about 500 pounds per square inch. In one embodiment, the screw is allowed to rotate at about 100 revolutions per minute, the temperature along barrel 5 is maintained at about 70° C. in the first barrel section and 160° C. further downstream, and the die pressure is about 50 pounds per square inch.

When crosslinking in a batch internal melt mixing device, the residence time is preferably in the range of about 10 seconds to about 5 minutes. The rotational speed of a rotor in the device is preferably about 10 to about 500 revolutions per minute.

In operation of the second part of the proposed process for diluting the said highly crosslinked precursor resin to a toner resin or toner with desired microgel content, for example from about 1 to about 10 weight percent for high gloss application and from about 20 to about 45 weight percent for low gloss application, the components to be melt mixed in the extruder, that is the highly crosslinked precursor resin containing from about 20 to about 75 weight percent gel, base resin, and optionally pigment and other toner additives, are preblended and enter the extrusion apparatus from the first upstream supply port 8 and/or second downstream supply port 9. Optionally, the said toner resin or toner components are fed separately to the extrusion apparatus through the first upstream supply port 8 and/or second downstream supply port 9. Both resins, pigment and other toner additives usually in the form of solid pellets, chips, granules, powders or other forms can be fed to the first supply port 8 and second downstream supply port 9 by starve feeding, gravity feeding, volumetric feeding, loss-in weight feeding, or other known feeding methods. This does not preclude other methods of adding the said toner resin or toner components to the extruder. After all components have been fed into screw channel 7, the mixture is melted as it is heated, but preferably at low temperature, for example from about 90° C. to about 130° C. to ensure good mixing of all components. Heating takes place from two sources: (1) external barrel heating from heaters 11, and (2) internal heating from viscous dissipation within the polymer melt itself. The rotational speed of the extruder screw preferably ranges from about 50 to about 500 revolutions per minute. If needed, volatiles may be removed through downstream devolatilizer 10 by applying vacuum. At the end of screw channel 7, the molten diluted crosslinked toner resin or toner is pumped through die 13, such as for example, a stand die, to pelletizer 14 such as, for example, a water berth pelletizer, underwater granulator, and the like.

When dilution is carried out in a batch melt mixing device, the residence time is preferably in range of about 1 to about 10 minutes. The rotational speed of a rotor in the device is preferably about 10 to about 500 revolutions per minute.

The toner resins are generally present in the toner of the invention in an amount of from about 40 to about 98 percent by weight, and more preferably from about 70 to about 98 percent by weight, although they may be present in greater or lesser amounts, provided that the objectives of the invention are achieved. For example, toner resins of the invention can be subsequently melt blended or otherwise mixed with a colorant, charge carrier additives, surfactants, emulsifiers, pigment dispersants, flow additives, and the like. In the toner preparation process of the present invention, all components can be combined into one process, that is, the highly crosslinked resin, base resin and pigment, and other toner additives can be fed into the extruder and melt mixed to prepare toner. The resultant product can then be pulverized by known methods, such as milling, to form toner particles. The toner particles preferably have an average volume particle diameter of about 5 to about 25 microns, and more preferably about 5 to about 15 microns.

Various suitable colorants can be employed in toners of the invention, including suitable colored pigments, dyes, and mixtures thereof including carbon black, such as REGAL 330® carbon black (Cabot), Acetylene Black, Lamp Black, Aniline Black, Chrome Yellow, Zinc Yellow, Sicofast Yellow, Luna Yellow, NOVAPERM YELLOW™, Chrome Orange, Bayplast Orange, Cadmium Red, LITHOL SCARLET™, HOSTAPERM RED™, FANAL PINK®, HOSTAPERM PINK™, Lithol Red, Rhodamine Lake B, Brilliant Carmine, HELIOGEN BLUE™, HOSTAPERM BLUE™, NEOPAN BLUE™, PV FAST BLUE™, Cinquassi Green, HOSTAPERM GREEN™, titanium dioxide, cobalt, nickel, iron powder, SICOPUR 4068 FF; and iron oxides such as MAPICO BLACK™ (Columbia), NP608™ and NP604™ (Northern Pigment), BAYFERROX 8610™ (Bayer), MO8699™ (Mobay), TMB-100™ (Magnox), mixtures thereof, and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner, and about 5 to about 60 percent by weight for black toner.

Various known suitable effective positive or negative charge enhancing additives can be selected for incorporation into the toner compositions of the present invention, preferably in an amount of about 0.1 to about 10, more preferably about 1 to about 3 percent by weight. Examples include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum complex salts such as BONTRON E84™ or E88™ (Hodogaya Chemical); and the like.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles which are positively charged will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the entire disclosure of which is hereby totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are totally incorporated herein by reference.

The selected carrier particles can be used with or without a coating, the coating generally being comprised of fluoropolymers, such as polyvinylidene fluoride resins, terpolymers of styrene, methyl methacrylate, and a silane, such as triethoxy silane, tetrafluoroethylenes, other known coatings and the like.

The diameter of the carrier particles is generally from about 50 microns to about 1,000 microns, preferably from about 50 to about 200 microns, thus allowing these particles to possess sufficient density and inertia to avoid adherence to the electrostatic images during the development process. The carrier particles can be mixed with the toner particles in various suitable combinations. However, best results are obtained when about 1 part carrier to about 10 parts to about 200 parts by weight of toner are mixed.

Toners of the invention can be used in known electrostatographic imaging methods. The fusing energy requirements of some of those methods can be reduced in view of the advantageous fusing properties achieved with the toner of the present invention. Thus, for example, the toners or developers of the invention can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll at a temperature lower than 200° C., preferably lower than 160° C., and more preferably from about 110° C. to about 140° C. Images with high or low gloss (matte) can be obtained as indicated herein.

The invention will further be illustrated in the following, nonlimiting Examples, it being understood that these Examples are intended to be illustrative only and that the invention is not intended to be limited to the materials, conditions, process parameters and the like recited herein. Parts and percentages are by weight unless otherwise indicated.

EXAMPLE I

A highly crosslinked unsaturated polyester precursor resin is prepared by reacting 99.2 percent by weight of a linear bisphenol A fumarate polyester base resin with a Mn of about 5,300, a $M_w$ of about 16,100, a $M_w/M_n$ of about 3.04 as measured by GPC, onset Tg of about 56° C. as measured by DSC, and melt flow index of about 32 grams per 10 minutes (measured at 117° C. with a 2.16 kilogram weight), and which contains about 50 parts per million of hydroquinone; and 0.8 percent by weight of benzoyl peroxide initiator as outlined in the following procedure.

The unsaturated polyester base resin and benzoyl peroxide initiator are blended in a rotary tumble blender for 30 minutes. The resulting dry mixture is then fed into a Werner & Pfleiderer ZSK-30 twin screw extruder, with a screw diameter of 30.7 millimeters and a length-to-diameter (L/D) ratio of 37.2, at 10 pounds per hour using a loss-in-weight feeder. The crosslinking is accomplished in the extruder using the following process conditions: barrel temperature profile of 70°/160°/160°/160°/160°/160°/160° C., die head temperature of 160° C., screw rotational speed of 100 revolutions per minute, and average residence time of about three minutes. The extrudate melt, upon exiting from the strand die, is cooled in a water bath, pelletized and pulverized. The crosslinked polyester product has an onset Tg of about 55° C. as measured by DSC, melt flow index of about 0.1 gram per 10 minutes (measured at 117° C. with a 2.16 kilogram weight), a gel content of about 53 weight percent and a mean microgel particle size of about 0.1 micron as determined by transmission electron microscopy.

The linear and crosslinked portions of the product are separated by dissolving the product in tetrahydrofuran and filtering off the microgel. The dissolved part is reclaimed by evaporating the tetrahydrofuran. This linear part of the resin, when characterized by GPC, is found to have a $M_n$ of about 5,100, a $M_w$ of about 15,600, a $M_w/M_n$ of about 3.06, and an onset Tg of about 55° C., which is substantially the same as the original noncrosslinked base resin, indicating it contains no sol.

EXAMPLE II

A toner is prepared by melt mixing 44.8 percent by weight of highly crosslinked precursor polyester resin of Example I, 50.2 percent by weight of linear bisphenol A fumarate polyester base resin with properties described in Example I (dilution factor of 1.12), and 5 percent by weight of REGAL 330® carbon black as outlined in the following procedure.

The highly crosslinked precursor unsaturated polyester resin, the unsaturated polyester base resin, and carbon black are blended in a rotary tumble blender for 30 minutes. The resulting dry mixture is then fed into a Werner & Pfleiderer ZSK-30 twin screw extruder with a screw diameter of 30.7 millimeters and a length-to-diameter (L/D) ratio of 37.2, at 10 pounds per hour using a loss-in-weight feeder. The melt mixing is accomplished in the extruder using the following process conditions: barrel temperature profile of 70°/90°/90°/90°/90°/90°/90° C., die head temperature of 120° C., screw rotational speed of 250 revolutions per minute, and average residence time of about three minutes. The extrudate melt, upon exiting from the strand die, is cooled in a water bath, pelletized and classified to form a toner with an average particle diameter of about 9.2 microns and a geometric size distribution (GSD) of about 1.32. The toner has an onset Tg of about 54° C. as measured by DSC, melt flow index of about 3.2 grams per 10 minutes (measured at 117° C. with a 2.16 kilogram weight), a gel content of about 25 weight percent, and a mean microgel particle size of about 0.1 micron as determined by transmission electron microscopy.

The toner is evaluated for fixing, gloss, blocking, and vinyl offset performance. The results in Table 1 indicate that the minimum fix temperature is about 126° C., the hot offset temperature is about 155° C., the fusing latitude is about 29° C., and the gloss is less than about 5 gloss units when the following fusing conditions are utilized: process speed of about 300 millimeters per second, dwell time of about 16 milliseconds, and fuser oil application rate of about 1.5 micrograms per copy. Also, the toner has excellent blocking performance (about 55° C. as measured by DSC) and exhibits no apparent vinyl offset as determined by visual observation.

EXAMPLE III

A toner is prepared by melt mixing 53.8 percent by weight of highly crosslinked precursor polyester resin of Example I, 41.2 percent by weight of linear bisphenol A fumarate polyester base resin with properties described in Example I (dilution factor of 0.77), and 5 percent by weight of REGAL 330® carbon black as outlined in the following procedure.

The highly crosslinked precursor polyester resin, the unsaturated polyester base resin, and carbon black are blended in a rotary tumble blender for 30 minutes. The resulting dry mixture is then fed into a Werner & Pfleiderer ZSK-30 twin screw extruder with a screw diameter of 30.7 millimeters and a length-to-diameter (L/D) ratio of 37.2 at 10 pounds per hour using a loss-in-weight feeder. The melt mixing is carried out in the extruder using the following process conditions: barrel temperature profile of 70°/90°/90°/90°/90°/90°/90° C., die head temperature of 120° C., screw rotational speed of 250 revolutions per minute, and average residence time of about three minutes. The extrudate melt, upon exiting from the strand die, is cooled in a water bath, pelletized and classified to form a toner with an average particle diameter of about 8.8 microns and a geometric size distribution (GSD) of about 1.29. The toner has an onset Tg of about 54° C. as measured by DSC, melt flow index of about 2.3 grams per 10 minutes (measured at 117° C. with a 2.16 kilogram weight), a gel content of about 30 weight percent, and a mean microgel particle size of about 0.1 micron as determined by transmission electron microscopy.

The toner is evaluated according to the same procedure as in Example II. The results in Table 1 indicate that the minimum fix temperature is about 127° C., the hot offset temperature is about 165° C., the fusing latitude is about 38° C., and the gloss is less than about 5 gloss units. Also, the toner has excellent blocking performance (about 55° C. as measured by DSC) and exhibits no apparent vinyl offset.

EXAMPLE IV

A toner is prepared by melt mixing 64.5 percent by weight of highly crosslinked precursor polyester resin of Example I, 30.5 percent by weight of linear bisphenol A fumarate polyester base resin with properties described in Example I (dilution factor of 0.47), and 5 percent by weight of REGAL 330® carbon black as outlined in the following procedure.

The highly crosslinked precursor polyester resin, the unsaturated polyester base resin, and carbon black are blended in a rotary tumble blender for 30 minutes. The resulting dry mixture is then fed into a Werner & Pfleiderer ZSK-30 twin screw extruder with a screw diameter of 30.7 millimeters and a length-to-diameter (L/D) ratio of 37.2 at 10 pounds per hour using a loss-in-weight feeder. The melt mixing is carried out in the extruder using the following process conditions: barrel temperature profile of 70°/90°/90°/90°/90°/90°/90° C., die head temperature of 120° C., screw rotational speed of 250 revolutions per minute, and average residence time of about three minutes. The extrudate melt, upon exiting from the strand die, is cooled in a water bath, pelletized and classified to form a toner with an average particle diameter of about 9.3 microns and a geometric size distribution (GSD) of about 1.31. The toner has an onset Tg of about 54° C. as measured by DSC, melt flow index of about 1.6 grams per 10 minutes (measured at 117° C. with a 2.16 kilogram weight), a gel content of about 36 weight percent, and a mean microgel particle size of about 0.1 micron as determined by transmission electron microscopy.

The toner is evaluated according to the same procedure as in Example II. The results in Table 1 indicate that the minimum fix temperature is about 128° C., the hot offset temperature is about 175° C., the fusing latitude is about 47° C., and the gloss is less than about 5 gloss units. Also, the toner has excellent blocking performance (about 53° C. as measured by DSC) and exhibits no apparent vinyl offset.

TABLE 1

| Example | Gel % | MFT, °C. | HOT, °C. | FL, °C. | Gloss, gu |
|---|---|---|---|---|---|
| II | 25 | 126 | 155 | 29 | <5 |
| III | 30 | 127 | 165 | 38 | <5 |
| IV | 36 | 128 | 180 | 52 | <5 |

EXAMPLE V

A highly crosslinked unsaturated polyester precursor resin is prepared by reacting 99.65 percent by weight of a linear bisphenol A fumarate polyester base resin having a $M_n$ of about 5,400, a $M_w$ of about 15,900, a $M_w/M_n$ of about 2.94 as measured by GPC, an onset Tg of about 56° C. as measured by DSC, and melt flow index of about 35 grams per 10 minutes (measured at 117° C. with a 2.16 kilogram weight), and contains about 50 parts per million of hydroquinone; and 0.35 percent by weight benzoyl peroxide initiator as outlined in the following procedure.

The unsaturated polyester base resin and benzoyl peroxide initiator are blended in a rotary tumble blender for 30 minutes. The resulting dry mixture is then fed into a Werner & Pfleiderer ZSK-30 twin screw extruder with a screw diameter of 30.7 millimeters and a length-to-diameter (L/D) ratio of 37.2 at 10 pounds per hour using a loss-in-weight feeder. The crosslinking is carried out in the extruder using the following process conditions: barrel temperature profile of 70°/160°/160°/160°/160°/160°/160° C., die head temperature of 160° C., screw rotational speed of 100 revolutions per minute, and average residence time of about three minutes. The extrudate melt, upon exiting from the strand die, is cooled in a water bath, pelletized and pulverized. The crosslinked polyester product has an onset Tg of about 55°

C. as measured by DSC, melt flow index of about 1.2 grams per 10 minutes (measured at 117° C. with a 2.16 kilogram weight), a gel content of about 32 weight percent, and a mean microgel particle size of about 0.1 micron as determined by transmission electron microscopy.

The linear and crosslinked portions of the product are separated by dissolving the product in tetrahydrofuran and filtering off the microgel. The dissolved part is reclaimed by evaporating the tetrahydrofuran. This linear part of the resin, when characterized by GPC, is found to have a $M_n$ of about 5,200, a $M_w$ of about 15,600, a $M_w/M_n$ of about 3.0, and an onset Tg of about 55° C., which is substantially the same as the original noncrosslinked base resin, indicating it contains no sol.

EXAMPLE VI

A toner is prepared by melt mixing 9.2 percent by weight of highly crosslinked precursor polyester resin of Example V, 88.8 percent by weight of linear bisphenol A fumarate polyester base resin with properties described in Example V (dilution factor of 9.65), and 2 percent by weight of PV FAST BLUE™ pigment as outlined in the following procedure.

The highly crosslinked precursor polyester resin, the unsaturated polyester base resin, and pigment are blended in a rotary tumble blender for 30 minutes. The resulting dry mixture is then fed into a Werner & Pfleiderer ZSK-30 twin screw extruder with a screw diameter of 30.7 millimeters and a length-to-diameter (L/D) ratio of 37.2 at 10 pounds per hour using a loss-in-weight feeder. The melt mixing is carried out in the extruder using the following process conditions: barrel temperature profile of 70°/90°/90°/90°/90°/90°/90° C., die head temperature of 120° C., screw rotational speed of 250 revolutions per minute, and average residence time of about three minutes. The extrudate melt, upon exiting from the strand die, is cooled in a water bath, pelletized and classified to form a toner with an average particle diameter of about 6.8 microns and a geometric size distribution (GSD) of about 1.30. The toner has an onset Tg of about 54° C. as measured by DSC, melt flow index of about 25 grams per 10 minutes (measured at 117° C. with a 2.16 kilogram weight), a gel content of about 3 weight percent, and a mean microgel particle size of about 0.1 micron as determined by transmission electron microscopy.

The toner is evaluated for fixing, gloss, blocking, and vinyl offset performance. The results in Table 2 indicate that the minimum fix temperature is about 133° C., the hot offset temperature is greater than about 200° C., the fusing latitude is greater than about 67° C., the gloss 50 temperature is about 136° C., the gloss latitude is greater than about 64° C., and the peak gloss is about 83 gloss units when the following fusing conditions are utilized: process speed of about 160 millimeters per second, dwell time of about 37.5 milliseconds, and fuser oil application rate of about 25 micrograms per copy. Also, the toner has excellent blocking performance (about 54° C. as measured by DSC) and exhibits no apparent vinyl offset.

EXAMPLE VII

A toner is prepared by melt mixing 15.3 percent by weight of highly crosslinked precursor polyester resin of Example V, 82.7 percent by weight of linear bisphenol A fumarate polyester base resin with properties described in Example V (dilution factor of 5.41), and 2 percent by weight of PV FAST BLUE™ pigment as outlined in the following procedure.

The highly crosslinked precursor polyester resin, the unsaturated polyester base resin, and pigment are blended in a rotary tumble blender for 30 minutes. The resulting dry mixture is then fed into a Werner & Pfleiderer ZSK-30 twin screw extruder with a screw diameter of 30.7 millimeters and a length-to-diameter (L/D) ratio of 37.2 at 10 pounds per hour using a loss-in-weight feeder. The melt mixing is carried out in the extruder using the following process conditions: barrel temperature profile of 70°/90°/90°/90°/90°/90°/90° C., die head temperature of 120° C., screw rotational speed of 250 revolutions per minute, and average residence time of about three minutes. The extrudate melt, upon exiting from the strand die, is cooled in a water bath, pelletized and classified to form a toner with an average particle diameter of about 6.7 microns, and a geometric size distribution (GSD) of about 1.31. The toner has an onset Tg of about 54° C. as measured by DSC, melt flow index of about 20 grams per 10 minutes (measured at 117° C. with a 2.16 kilogram weight), a gel content of about 5 weight percent, and a mean microgel particle size of about 0.1 micron as determined by transmission electron microscopy.

The toner is evaluated according to the same procedure as in Example VI. The results in Table 2 indicate that the minimum fix temperature is about 132° C., the hot offset temperature is greater than about 200° C., the fusing latitude is greater than about 68° C., the gloss 50 temperature is about 144° C., the gloss latitude is greater than about 56° C., and the peak gloss is about 80 gloss units. Also, the toner has excellent blocking performance (about 54° C. as measured by DSC) and exhibits no apparent vinyl offset.

EXAMPLE VIII

A toner is prepared by melt mixing 24.5 percent by weight of highly crosslinked precursor polyester resin of Example V, 73.5 percent by weight of linear bisphenol A fumarate polyester base resin with properties described in Example V (dilution factor of 3.0), and 2 percent by weight of PV FAST BLUE™ pigment as outlined in the following procedure.

The highly crosslinked precursor polyester resin, the unsaturated polyester base resin, and pigment are blended in a rotary tumble blender for 30 minutes. The resulting dry mixture is then fed into a Werner & Pfleiderer ZSK-30 twin screw extruder with a screw diameter of 30.7 millimeters and a length-to-diameter (L/D) ratio of 37.2 at 10 pounds per hour using a loss-in-weight feeder. The melt mixing is accomplished in the extruder using the following process conditions: barrel temperature profile of 70°/90°/90°/90°/90°/90°/90° C., die head temperature of 120° C., screw rotational speed of 250 revolutions per minute, and average residence time of about three minutes. The extrudate melt, upon exiting from the strand die, is cooled in a water bath, pelletized and classified to form a toner with an average particle diameter of about 7.2 microns, and a geometric size distribution (GSD) of about 1.32. The toner has an onset Tg of about 54° C. as measured by DSC, melt flow index of about 13 grams per 10 minutes (measured at 117° C. with a 2.16 kilogram weight), a gel content of about 8 weight percent, and a mean microgel particle size of about 0.1 micron as determined by transmission electron microscopy.

The toner is evaluated according to the same procedure as in Example VI. The results in Table 2 indicate that the minimum fix temperature is about 133° C., the hot offset temperature is greater than about 200° C., the fusing latitude is greater than about 67° C., the gloss 50 temperature is about 152° C., the gloss latitude is greater than about 48° C., and the peak gloss is about 75 gloss units. Also, the toner has excellent blocking performance (about 54° C. as measured by DSC) and exhibits no apparent vinyl offset.

TABLE 2

| Example | Gel % | MFT, °C. | HOT, °C. | FL, °C. | $T(G_{50})$, °C. | GL, °C. | Peak Gloss gu |
|---|---|---|---|---|---|---|---|
| VI | 3 | 133 | >200 | >67 | 136 | >64 | 83 |
| VII | 5 | 132 | >200 | >68 | 144 | >56 | 80 |
| VIII | 8 | 133 | >200 | >67 | 152 | >48 | 75 |

EXAMPLE IX

A highly crosslinked unsaturated polyester precursor resin is prepared by reacting 99.0 percent by weight of a linear bisphenol A fumarate polyester base resin having a $M_n$ of about 5,300, a $M_w$ of about 16,100, a $M_w/M_n$ of about 3.04 as measured by GPC, an onset Tg of about 56° C. as measured by DSC, and melt flow index of about 32 grams per 10 minutes (measured at 117° C. with a 2.16 kilogram weight), and contains about 50 parts per million of hydroquinone; and 1.0 percent by weight of benzoyl peroxide initiator as outlined in the following procedure.

The unsaturated polyester base resin and benzoyl peroxide initiator are blended in a rotary tumble blender for 30 minutes. The resulting dry mixture is then fed into a Werner & Pfleiderer ZSK-30 twin screw extruder with a screw diameter of 30.7 millimeters and a length-to-diameter (L/D) ratio of 37.2 at 10 pounds per hour using a loss-in-weight feeder. The crosslinking is carried out in the extruder using the following process conditions: barrel temperature profile of 70°/160°/160°/160°/160°/160°/160° C., die head temperature of 160° C., screw rotational speed of 100 revolutions per minute, and average residence time of about three minutes. The extrudate melt, upon exiting from the strand die, is cooled in a water bath, pelletized and pulverized. The crosslinked polyester product has an onset Tg of about 55° C. as measured by DSC, melt flow index of about 0.1 gram per 10 minutes (measured at 117° C. with a 2.16 kilogram weight), a gel content of about 61 weight percent, and a mean microgel particle size of about 0.1 micron as determined by transmission electron microscopy.

The linear and crosslinked portions of the product are separated by dissolving the product in tetrahydrofuran and filtering off the microgel. The dissolved part is reclaimed by evaporating the tetrahydrofuran. This linear part of the resin, when characterized by GPC, is found to have a $M_n$ of about 5,100, a $M_w$ of about 15,500, a $M_w/M_n$ of about 3.04, and an onset Tg of about 55° C., which is substantially the same as the original noncrosslinked base resin, indicating it contains no sol.

EXAMPLE X

A toner is prepared by melt mixing 45.15 percent by weight of highly crosslinked precursor polyester resin of Example IX, 49.85 percent by weight of linear bisphenol A fumarate polyester base resin with properties described in Example IX (dilution factor of 1.10), and 5 percent by weight of REGAL 330® carbon black as outlined in the following procedure.

The highly crosslinked precursor polyester resin, the unsaturated polyester base resin, and carbon black are blended in a rotary tumble blender for 30 minutes. The resulting dry mixture is then fed into a Werner & Pfleiderer ZSK-30 twin screw extruder with a screw diameter of 30.7 millimeters and a length-to-diameter (L/D) ratio of 37.2 at 10 pounds per hour using a loss-in-weight feeder. The melt mixing is carried out in the extruder using the following process conditions: barrel temperature profile of 70°/90°/90°/90°/90°/90°/90° C., die head temperature of 120° C., screw rotational speed of 250 revolutions per minute, and average residence time of about three minutes. The extrudate melt, upon exiting from the strand die, is cooled in a water bath, pelletized and classified to form a toner with an average particle diameter of about 9.3 microns and a geometric size distribution (GSD) of about 1.28. The toner has an onset Tg of about 54° C. as measured by DSC, melt flow index of about 2.6 grams per 10 minutes (measured at 117° C. with a 2.16 kilogram weight), a gel content of about 29 weight percent, and a mean microgel particle size of about 0.1 micron as determined by transmission electron microscopy.

The toner is evaluated according to the same procedure as in Example II. The results indicate that the minimum fix temperature is about 129° C., the hot offset temperature is about 170° C., the fusing latitude is about 41° C., and the gloss is less than about 5 gloss units. Also, the toner has excellent blocking performance (about 54° C. as measured by DSC) and exhibits no apparent vinyl offset.

Other embodiments and modifications of the present invention may occur to those skilled in the art subsequent to a review of the information presented herein; these embodiments and modifications, as well as equivalents thereof, are also included within the scope of this invention.

What is claimed is:

1. A process consisting essentially of:

(a) reactive melt mixing of a base resin with a chemical initiator and crosslinking of said base resin to enable a highly crosslinked precursor resin, said highly crosslinked precursor resin being substantially free of sol, and comprising uncrosslinked portions and crosslinked portions, said crosslinked portions comprised of high density crosslinked microgel particles; and (b) accomplishing dilution by melt mixing said highly crosslinked precursor resin of (a) with a base resin to form a partially crosslinked toner resin, said toner resin being substantially free of sol, and comprising linear uncrosslinked portions and crosslinked portions, said crosslinked portions comprised essentially of high density crosslinked microgel particles, wherein said microgel particles are present in an amount of from about 1 to about 45 percent by weight of said toner resin.

2. The process in accordance with claim 1 wherein said highly crosslinked precursor resin contains from about 20 to about 75 percent by weight of microgel particles.

3. The process in accordance with claim 1 wherein the base resin and initiator are blended prior to the reactive melt mixing of 1 (*a*).

4. The process in accordance with claim 1 wherein the highly crosslinked precursor resin and base resin are blended prior to the dilution of 1 (*b*).

5. The process in accordance with claim 1 wherein said highly crosslinked precursor resin is prepared by a high temperature, high shear reactive melt mixing process.

6. The process in accordance with claim 1 wherein the reactive melt mixing and dilution melt mixing are accomplished in a batch melt mixing device or a continuous melt mixing device.

7. The process in accordance with claim 6 wherein the continuous melt mixing device is an extruder.

8. The process in accordance with claim 1 further comprising mixing chemical initiator into said base resin, and wherein the resulting mixture is fed into a melt mixing device, melting the mixture at low temperature of about 40° to about 130° C. to allow initiator to disperse in said base resin, increasing the temperature to from about 100° C. to about 200° C. to enable crosslinking of said base resin, and removing the resulting highly crosslinked precursor resin with a gel content of from about 20 to about 75 percent by weight from the melt mixing device, cooling and grinding the said highly crosslinked precursor resin, blending the ground highly crosslinked precursor resin with a linear base resin in an amount from about 1 to about 99 weight percent of the mixture, and melt mixing the resulting blend in a melt mixing device at a low temperature of about 40° C. to about 130° C. to allow mixing of said two resins, and pumping the resulting melt through a die to a pelletizer.

9. The process in accordance with claim 1 wherein said microgel particles are about 0.005 to about 0.1 micron in average volume diameter, and are substantially uniformly distributed in said resin.

10. The process in accordance with claim 1 wherein said microgel particles have no more than a single bridging molecule between crosslinked chains.

11. The process in accordance with claim 1 wherein said base resin comprises linear unsaturated polyester resin.

12. The process in accordance with claim 11 wherein said linear unsaturated polyester resin is poly(propoxylated bisphenol A fumarate).

13. The process in accordance with claim 1 wherein said base resin has a number average molecular weight, $M_n$, as measured by gel permeation chromatography, in the range of from about 1,000 to about 20,000; a weight average molecular weight, $M_w$, in the range of from about 2,000 to about 40,000; and a molecular weight distribution, $M_w/M_n$, in the range of from about 1.5 to about 6.

14. The process in accordance with claim 1 wherein said linear portions have an onset glass transition temperature, Tg, as measured by differential scanning calorimetry in the range of from about 50° C. to about 70° C.

15. The process in accordance with claim 1 wherein said linear portions have a melt viscosity as measured with a mechanical spectrometer at 10 radians per second, from about 5,000 to about 200,000 poise at 100° C., and said melt viscosity drops sharply with increasing temperature to from about 100 to about 5,000 poise as the temperature increases from 100° C. to 130° C., and a melt flow index of from about 20 to about 80 grams per 10 minutes as measured at 117° C. with a 2.16 kilogram weight.

16. The process in accordance with claim 1 wherein said toner resin has a minimum fix temperature of from about 100° C. to about 160° C.

17. The process in accordance with claim 1 wherein said toner resin has a fusing latitude of from about 20° C. to about 150° C.

18. The process in accordance with claim 1 wherein said toner resin possesses high gloss with a gloss latitude of from about 40° C. to about 100° C.

19. The process in accordance with claim 1 wherein a toner prepared from the resin obtained and containing pigment has a gloss of from about 1 to about 80 gloss units.

20. The process in accordance with claim 11 wherein said linear unsaturated polyester resin is prepared from (a) diacids or anhydrides selected from the group consisting of succinic acid, glutaric acid, adipic acid, pimelic acid, suberic acid, azelaic acid, sebacic acid, isophthalic acid, terephthalic acid, hexachloroendomethylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, maleic acid, fumaric acid, chloromaleic acid, methacrylic acid, acrylic acid, itaconic acid, citraconic acid, mesaconic acid, maleic anhydride, and mixtures thereof; and (b) diols selected from the group consisting of propylene glycol, ethylene glycol, diethylene glycol, neopentyl glycol, dipropylene glycol, dibromoneopentyl glycol, propoxylated bisphenol-A, 2,2,4-trimethylpentane-1,3-diol, tetrabromobisphenol dipropoxy ether, 1,4-butanediol, and mixtures thereof.

21. The process in accordance with claim 1 wherein said crosslinking is initiated by a chemical initiator selected from the group consisting of organic peroxides and azo compounds.

22. The process in accordance with claim 21 wherein the weight fraction of said chemical initiator in said base resin is in the range of from about 0.1 to about 15 percent by weight.

23. A process comprising (a) reactive melt mixing of a base resin with a chemical initiator and crosslinking of said base resin to enable a highly crosslinked precursor resin, said highly crosslinked precursor resin being substantially free of sol, and comprising uncrosslinked portions and crosslinked portions, said crosslinked portions comprised of high density crosslinked microgel particles; and (b) accomplishing dilution by melt mixing said highly crosslinked precursor resin of (a) with a base resin to form a partially crosslinked toner resin, said toner resin being substantially free of sol, and comprising linear uncrosslinked portions and crosslinked portions, said crosslinked portions comprised essentially of high density crosslinked microgel particles, wherein said microgel particles are present in an amount of from about 1 to about 45 percent by weight of said toner resin; and further comprising mixing chemical initiator into said base resin, and wherein the resulting mixture is fed into a melt mixing device, melting the mixture at low temperature of about 40° to about 130° C. to allow initiator to disperse in said base resin, increasing the temperature to from about 100° C. to about 200° C. to enable crosslinking of said base resin, and removing the resulting highly crosslinked precursor resin with a gel content of from about 20 to about 75 percent by weight from the melt mixing device, cooling and grinding the said highly crosslinked precursor resin, blending the ground highly crosslinked precursor resin with a linear base resin in an amount from about 1 to about 99 weight percent of the mixture, and melt mixing the resulting blend in a melt mixing device at a low temperature of about 40° C. to about 130° C. to allow mixing of said two resins, and pumping the resulting melt through a die to a pelletizer.

* * * * *